(12) United States Patent
Bialer et al.

(10) Patent No.: US 12,386,058 B2
(45) Date of Patent: Aug. 12, 2025

(54) ENHANCEMENT OF RADAR SIGNAL WITH SYNTHETIC RADAR SIGNAL GENERATED FROM VEHICLE LIDAR UNIT

(71) Applicant: GM GLOBAL TECHNOLOGY OPERATIONS LLC, Detroit, MI (US)

(72) Inventors: Oded Bialer, Petah Tivak (IL); Yuval Haitman, Oranit (IL)

(73) Assignee: GM Global Technology Operations LLC, Detroit, MI (US)

( * ) Notice: Subject to any disclaimer, the term of this patent is extended or adjusted under 35 U.S.C. 154(b) by 478 days.

(21) Appl. No.: 17/963,311

(22) Filed: Oct. 11, 2022

(65) Prior Publication Data

US 2024/0118408 A1 Apr. 11, 2024

(51) Int. Cl.
| | | |
|---|---|---|
| *G01S 13/86* | (2006.01) | |
| *G01S 7/35* | (2006.01) | |
| *G01S 7/40* | (2006.01) | |
| *G01S 7/41* | (2006.01) | |
| *G01S 13/931* | (2020.01) | |

(52) U.S. Cl.
CPC ............ *G01S 13/865* (2013.01); *G01S 7/356* (2021.05); *G01S 7/4021* (2013.01); *G01S 7/417* (2013.01); *G01S 13/931* (2013.01); *G01S 2013/93185* (2020.01)

(58) Field of Classification Search
None
See application file for complete search history.

(56) References Cited

U.S. PATENT DOCUMENTS

| | | | |
|---|---|---|---|
| 2019/0302259 A1* | 10/2019 | Van Fleet | ........... G01S 15/8997 |
| 2023/0130588 A1* | 4/2023 | Sivakumar | .............. G01S 13/89 |
| | | | 382/103 |
| 2023/0213643 A1* | 7/2023 | Hwang | ..................... G06T 7/50 |
| | | | 382/106 |

* cited by examiner

*Primary Examiner* — Whitney Moore
(74) *Attorney, Agent, or Firm* — Quinn IP Law

(57) ABSTRACT

A system of controlling operation of a vehicle includes a lidar unit and a radar unit configured to obtain measured lidar datapoints and a measured radar signal, respectively. A command unit is adapted to receive the measured lidar datapoints and the measured radar signal, the command unit including a processor and tangible, non-transitory memory on which instructions are recorded. The command unit is configured to identify respective objects in the measured lidar datapoints and assign a respective radar reflection intensity to the measured lidar datapoints in the respective objects. A synthetic radar signal is generated based in part on the radar reflection intensity. The command unit is configured to obtain an enhanced radar signal by adjusting the measured radar signal based on the synthetic radar reference signal.

19 Claims, 5 Drawing Sheets

ENHANCEMENT OF RADAR SIGNAL WITH SYNTHETIC RADAR SIGNAL GENERATED FROM VEHICLE LIDAR UNIT

INTRODUCTION

The present disclosure relates to enhancement of a measured radar signal using a synthetic radar signal that is generated from a vehicle lidar unit. As they journey through space and time, mobile platforms, such as motor vehicles, encounter both moving and non-moving objects. Many mobile platforms include an imaging sensor to track these objects. For example, a vehicle may include a radar sensor to detect objects proximate to the vehicle. However, automotive radar sensors may have limitations on their performance for a variety of reasons such as antenna size and packaging constraints.

SUMMARY

Disclosed herein is a system of controlling operation of a vehicle. A lidar unit and a radar unit are operatively connected to the vehicle and configured to obtain measured lidar datapoints and a measured radar signal, respectively. A command unit adapted to receive the measured lidar datapoints and the measured radar signal, the command unit including a processor and tangible, non-transitory memory on which instructions are recorded. The command unit is configured to identify respective objects in the measured lidar datapoints and assign a respective radar reflection intensity to the measured lidar datapoints of the respective objects. A synthetic radar signal is generated based in part on the radar reflection intensity. The command unit is configured to obtain an enhanced radar signal by adjusting the measured radar signal based on the synthetic radar reference signal.

Obtaining the enhanced radar signal may include adjusting an antenna array calibration matrix of the radar unit to minimize a difference between the measured radar signal and the synthetic radar signal. Obtaining the enhanced radar signal may include determining when a difference between respective maxima of the measured radar signal and the synthetic radar signal exceeds a predefined threshold. The emission power of the radar unit is increased until the difference is below the predefined threshold.

The command unit may be configured to employ a deep neural network for processing the measured radar signal such that obtaining the enhanced radar signal includes updating respective weights in the deep neural network. The vehicle may include an automatic braking module adapted to decelerate the vehicle, the command unit being configured to selectively activate the automatic braking module based in part on the enhanced radar signal.

Identifying the respective objects in the measured lidar datapoints includes classifying the respective objects into a plurality of categories via a predefined neural network. The plurality of categories includes at least one of motor vehicles, pedestrians, ground, buildings, utility poles and vegetation. The respective objects may be selected to be the ones with a relatively lower reflectivity.

The command unit may be configured to represent the measured lidar datapoints in the respective objects as a two-dimensional surface in a three-dimensional volume. In some embodiments, the two-dimensional surface is a polygon. The respective radar reflection intensity is based in part on an area of the polygon, a range from the lidar unit to the polygon, a class index of the respective object and a line angle between a line-of-sight from the lidar unit and a vector perpendicular to a surface defined by the polygon. The radar reflection intensity ($\rho$) may be calculated as $$\rho = \frac{1}{R^2} * g(\theta) * f(c),$$

where R is the range, $\theta$ is the line angle, g is a predefined first function, c is the class index of the respective object and f is a predefined second function.

Generating the synthetic radar signal may include generating an intermediate radar-received signal from the respective radar reflection intensity and generating the synthetic radar signal based in part on the intermediate radar-received signal. Generating the synthetic radar signal may include obtaining a range Fast Fourier Transform for each predefined chirp, and obtaining a Doppler Fast Fourier Transform for each bin in the range Fast Fourier Transform.

Disclosed herein is a method of controlling operation of a vehicle, the vehicle having a lidar unit, a radar unit and a command unit with a processor and tangible, non-transitory memory. The method includes obtaining measured lidar datapoints and a measured radar signal from the lidar unit and the radar unit, respectively. The method includes identifying respective objects in the measured lidar datapoints and assigning a respective radar reflection intensity to the measured lidar datapoints of the respective objects. A synthetic radar signal is generated based in part on the radar reflection intensity. The method includes obtaining an enhanced radar signal by adjusting the measured radar signal based on the synthetic radar signal.

The above features and advantages and other features and advantages of the present disclosure are readily apparent from the following detailed description of the best modes for carrying out the disclosure when taken in connection with the accompanying drawings.

DETAILED DESCRIPTION

Figure 1:
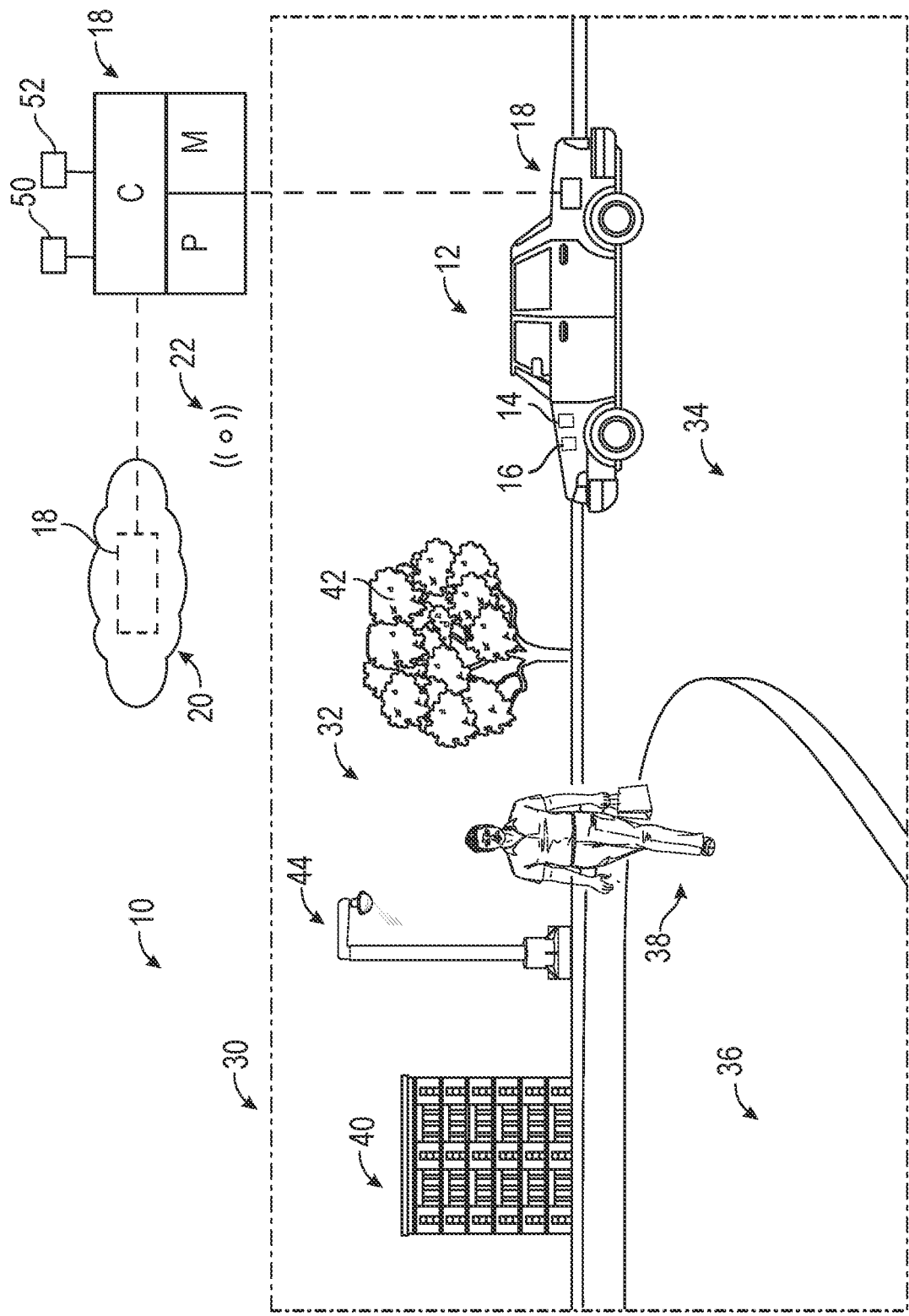
FIG. 1 is a schematic perspective view of system for controlling operation of a vehicle with a radar unit, a lidar unit and a command unit.

Referring to the drawings, wherein like reference numbers refer to like components, FIG. 1 schematically illustrates a system 10 of controlling operation of a vehicle 12. The vehicle 12 may be a mobile platform such as, but not limited to, a passenger car, sport utility car, light truck, heavy duty truck, ATV, minivan, bus, transit vehicle, bicycle, robot, farm implement (e.g., tractor), sports-related equipment (e.g., golf cart), boat, airplane and train. The vehicle 12 may take many different forms and include multiple and/or alternate components and facilities. It is to be understood that the vehicle 12 may take many different forms and have additional components.

Referring to FIG. 1, a lidar unit 14 and a radar unit 16 are operatively connected to the vehicle and configured to obtain measured lidar datapoints and a measured radar signal, respectively. The system 10 includes a command unit 18 adapted to receive the measured lidar datapoints and the measured radar signal. The command unit 18 has a controller C, at least one processor P and at least one memory M (or non-transitory, tangible computer readable storage medium) on which instructions are recorded for executing method 100 for generating a synthetic radar signal based in part on the measured lidar datapoints. The memory M can store command unit-executable instruction sets, and the processor P can execute the command unit-executable instruction sets stored in the memory M.

Referring to FIG. 1, the radar unit 16 observes an example scene 30 which may have respective objects 32 such as a street 34, a sidewalk 36, a pedestrian 38 walking on the sidewalk 36, a building 40, a tree 42 and an electric pole 44. FIG. 1 is not drawn to scale. As described below, the system 10 is adapted to generate a reference radar signal, referred to herein as a "synthetic radar signal" using the lidar measured signal obtained from the same scene 30 that the measured radar signal is obtained.

Referring to FIG. 1, the lidar unit 14 and the radar unit 16 may be positioned such that their respective field of view substantially overlaps. The signal obtained by the lidar unit 14 extracts different properties of reflectivity from the respective objects 32 in the scene 30, compared to the signal obtained by the radar unit 16. This enables bypassing of certain limitations related to the radar unit 16. The lidar unit 14 uses a laser source to target respective objects 32 in the scene 30 and measures the time for the reflected light to return. Lidar may employ visible, ultraviolet and near infrared electromagnetic radiation. The lidar unit 14 may include a microscopic array of individual antennas where the timing (phase) of each antenna is controlled to steer a cohesive signal in a specific direction.

The radar unit 16 includes antennas for transmitting electromagnetic waves in at least one of a radio and a microwave domain. The electromagnetic waves reflect off the respective objects 32 in the scene 30 and return to the radar unit 16, providing information about their location and speed. The radar unit 16 may employ phase-shifters to shift the phase of the electromagnetic waves to produce a phased-array beam. The location of the lidar unit 14 and the radar unit 16 relative to the vehicle 12 may be varied according to the application at hand. Other types of lidar systems or radar systems available to those skilled in the art may be employed.

As described below, the command unit 18 is configured to identify or classify the respective objects 32 in the measured lidar datapoints and assign a radar reflection intensity to respective datapoints in selected ones (chosen) of the respective objects 32. A synthetic radar signal is generated based in part on the radar reflection intensity. The command unit 18 is configured to obtain an enhanced radar signal by adjusting the measured radar signal based on the synthetic radar reference signal. The enhanced radar signal is beneficial for detecting radar faults, for improving on-line calibration of the radar unit 16 and updating the neural network that processes the measured radar signal.

In one embodiment, the command unit 18 is embedded in the vehicle 12. In another embodiment, the command unit 18 is stored in an "off-board" or remotely located cloud computing service 20, shown in FIG. 1. The cloud computing service 20 may include one or more remote servers hosted on the Internet to store, manage, and process data. The cloud computing service 20 may be at least partially managed by personnel at various locations, such as at a "back office."

Communication between the various components of the vehicle 12 and the cloud unit 20 may occur through a wireless network 22. The wireless network 22 may be a short-range network or a long-range network. The wireless network 22 may be a communication BUS, which may be in the form of a serial Controller Area Network (CAN-BUS). The wireless network 22 may be a serial communication bus in the form of a local area network which may include, but is not limited to, a Controller Area Network (CAN), a Controller Area Network with Flexible Data Rate (CAN-FD), Ethernet, Bluetooth, WIFI and other forms of data. The wireless network 22 may be a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. Other types of network technologies or communication protocols available to those skilled in the art may be employed.

Figure 2:
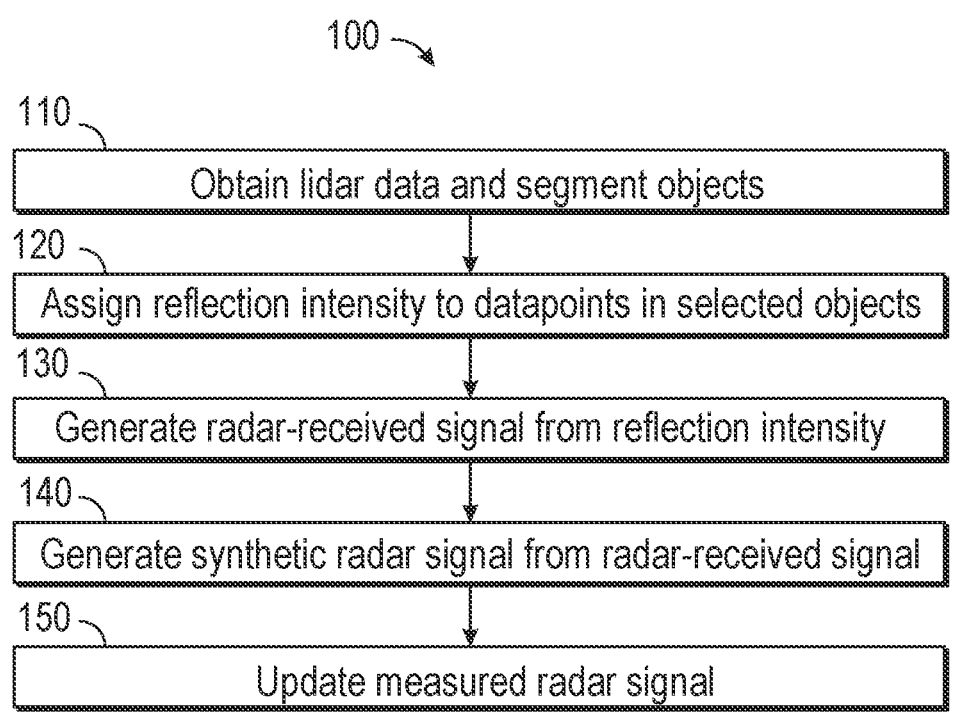
FIG. 2 is a schematic flow diagram for an example method executable by the command unit of FIG. 1.

Referring now to FIG. 2, a flowchart of the method 100 stored on and executable by the command unit 18 of FIG. 1 is shown. Method 100 may be embodied as computer-readable code or instructions stored on and partially executable by the command unit 18 of FIG. 1. Method 100 need not be applied in the specific order recited herein. Furthermore, it is to be understood that some steps may be eliminated.

Per block 110, the command unit 18 is programmed to obtain the measured lidar datapoints capturing a scene, such as scene 30 in FIG. 1, and classify or divide the respective objects 32 within the measured lidar datapoints or scene 30 into a plurality of categories or classes via a predefined neural network. The plurality of categories includes at least one of motor vehicles, pedestrians, ground, buildings, utility poles (involved in the dissemination or transfer of electric light or power) and vegetation. The respective objects 32 may include a street 34, a sidewalk 36, a pedestrian 38 walking on the sidewalk 36, a building 40, a tree 42 and a utility pole 44.

In some embodiments, the command unit 18 may select objects of interest in the segmentation of the respective objects 32 and selectively ignore some of the objects. For example, to reduce complexity, the command unit 18 may ignore metallic objects (e.g., utility pole 44) that already have a relatively sharp signal. Optionally, the respective objects 32 having a lower reflectivity may be retained for the synthetic radar signal. In other words, the command unit 18 may retain the categories having a lower reflectivity, such as pedestrians and vegetation, for generating the synthetic radar signal (per block 140 below).

Figure 4:
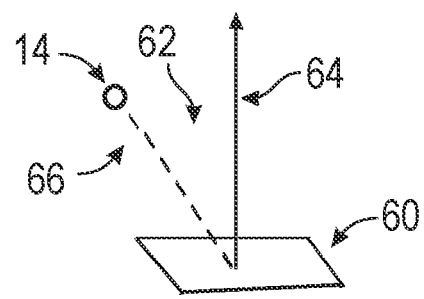
FIG. 4 is a schematic diagram illustrating a line of sight from the radar unit of FIG. 1.

The method 100 proceeds to block 120, where the command unit 18 is configured to represent the datapoints in the respective objects 32 (selected to be a part of the synthetic radar signal) as a two-dimensional or three-dimensional structure, such as a polygon or polyhedron. In other words, the respective objects 32 are converted to a two-dimensional surface in a three-dimensional volume. In one embodiment, the two-dimensional structure is a polygon 60, an example of which is schematically shown in FIG. 4.

Also, per block 120, the command unit 18 is adapted to assign radar reflection intensity to the datapoints of the selected ones of the respective objects 32. Referring to FIG. 4, the radar reflection intensity is based in part on an area of the polygon 60, a range from the lidar unit 14 to the polygon 60, a class index of the respective object and a line angle 62. The line angle 62(θ) lies between a line-of-sight 66 (see FIG. 4) from the lidar unit 14 and a vector 64 normal or perpendicular to a surface defined by the polygon 60 and. It is understood that FIG. 4 is not drawn to scale.

The radar reflection intensity (p) may calculated as $$\rho = \frac{1}{R^2} * g(\theta) * f(c),$$

where R is the range, θ is the line angle 62, g is a predefined first function, c is the class index of the respective object and f is a predefined second function. The predefined first function g is selected such that as the line angle 62 increases, the value of g(θ) decreases. In one example, the predefined first function g may be expressed as:

$$g = \frac{4\pi A^2}{R\lambda^2} * \cos^2(\theta) * \frac{\sin^4(\beta/2)}{(\beta/2)^4}.$$

Here $$\beta = \frac{2\pi}{\lambda} * \sin(\theta),$$

θ is the line angle 62, λ is the wavelength of the lidar unit 14, A is the area of the polygon 60 and R is the range from the lidar unit 14 to the polygon 60. The predefined second function $f(c)$ may be a defined by a Rice distribution function having Rice parameters that are a function of the class index c of the object in question.

Proceeding to block 130 of FIG. 2, the command unit 18 is adapted to generate an intermediate radar-received signal from the assigned reflection intensity. The nth intermediate radar-received signal ($x_n$) received at the kth receiver from ith transmitter may be obtained by summing over each of the reflection points as follows:

$$(x_n) = \sum_{m=0}^{M-1} \rho_m \cos\left(2\pi\left(F * \tau_m^{i,k} - \frac{\alpha}{2} * \tau_m^2 + \alpha * \tau_m^{i,k} u(nT_s)\right)\right).$$

Here n 0, 1, ... N−1, where n is the index of samples, m is the reflection point index, M is the number of reflection points, $\tau_m$ is the round trip delay between the ith transmit antenna of the lidar unit 14 to the reflection point and back to the kth receive antenna of the lidar unit 14, F is the carrier frequency, a is the chirp slope, N is the number of samples in a frame, $T_c$ is the chirp duration and $T_s$ is the sampling time. The factor u is defined as mod($nT_s$, $T_c$) which returns the remainder after division of $nT_s$ by $T_c$, where $nT_s$ is the dividend and $T_c$ is the divisor [u($nT_s$)=mod($nT_s$, $T_c$)].

Advancing to block 140 of FIG. 2, the command unit 18 is adapted to generate the synthetic radar signal based in part on the intermediate radar-received signal. Block 140 is shown in detail in FIG. 3. Block 140 includes sub-blocks 142 to 148 which need not be executed in the specific order shown. It is to be understood that some sub-blocks may be eliminated.

Figure 3:
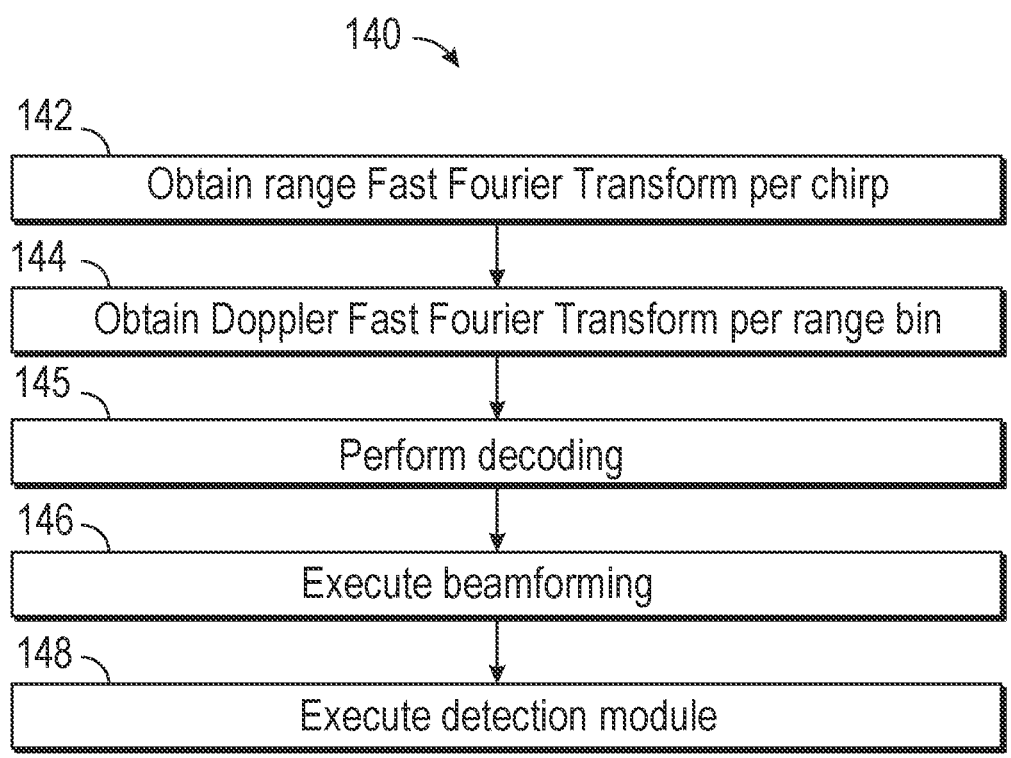
FIG. 3 is a schematic flow diagram for a portion of the method of FIG. 2.

Per sub-block 142 of FIG. 3, the command unit 18 is adapted to obtain a range Fast Fourier Transform for each chirp in the received signal. A chirp is a signal that increases or decreases over time and is also referred to as a sweep signal. The range is divided into a number of bins. Per sub-block 144 of FIG. 3, the command unit 18 is adapted to obtain Doppler Fast Fourier Transform for each bin in the range.

Per sub-block 145 of FIG. 3, the command unit 18 is adapted to execute beamforming to combine range and Doppler maps. The radar unit 16 includes receiver antennas configured to receive the reflected electromagnetic waves and direct towards respective beam modifiers. In the receive beamformer, the signal from each antenna may be amplified by various weighting patterns to achieve the desired sensitivity patterns. Beamforming may be used at both the transmitting and receiving ends in order to achieve spatial selectivity.

The radar unit 16 may employ multiple input, multiple output (MIMO) antenna technology in which multiple antennas are used at both the origin (transmitter) and the destination (receiver). Per sub-block 146 of FIG. 3, the command unit 18 is adapted to perform decoding to separate the signal received from different transmitters.

Per sub-block 148 of FIG. 3, the command unit 18 is adapted to execute a detection module to separate the target (respective objects 32 in the scene 30) from the noise/clutter. This may be done via a constant false alarm rate (CFAR) circuitry. The CFAR circuitry determines the power threshold above which the remainder signal may be considered to originate from the target as opposed to one of the spurious noise sources. In other words, the CFAR circuitry chooses a threshold level that provides a specified probability of false alarm, which may be governed by a probability density function.

Figure 5:
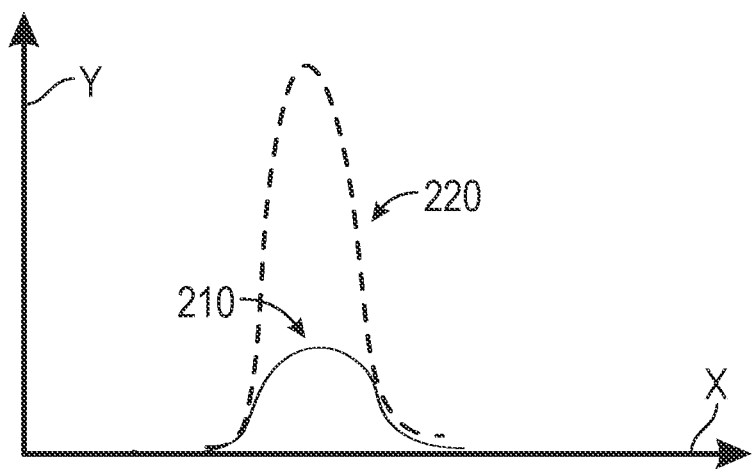
FIG. 5 is an example graph showing a measured radar signal contrasted with an enhanced radar signal.
Figure 6:
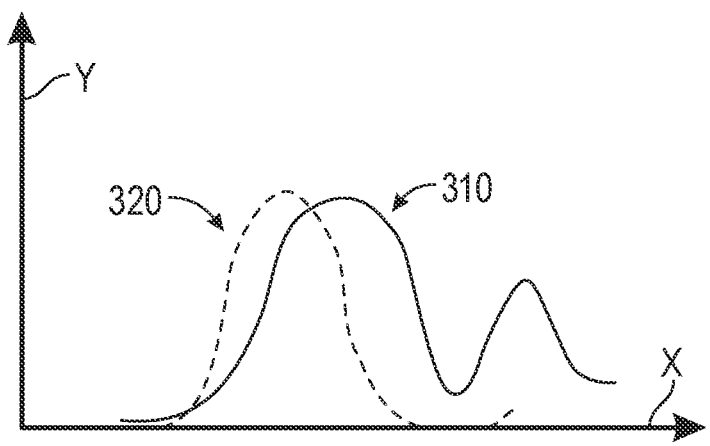
FIG. 6 is another example graph showing a measured radar signal contrasted with an enhanced radar signal.
Figure 7:
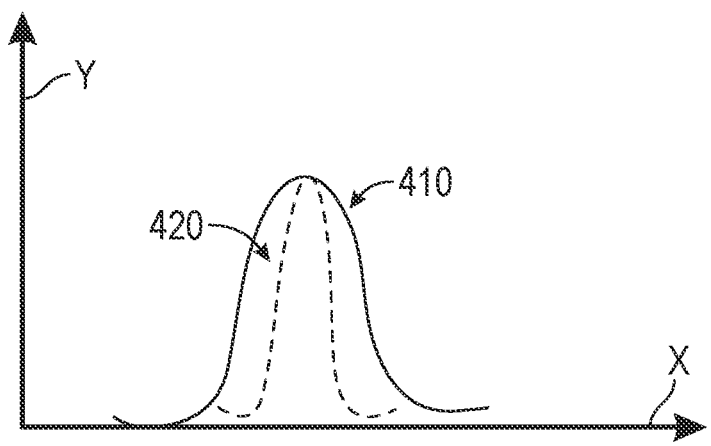
FIG. 7 is yet another example graph showing a measured radar signal contrasted with an enhanced radar signal.

Advancing to block 150 of FIG. 2, the command unit 18 is configured to obtain an enhanced radar signal by adjusting the measured radar signal based on the synthetic radar reference signal. This adjustment may be carried out in several ways. FIGS. 5-7 show examples of measured radar signal (solid line) contrasted with their corresponding enhanced radar signal (dashed lines). Referring to FIGS. 5-7, the vertical axis Y indicates signal amplitude while the horizontal axis X indicates time.

In FIG. 5, the measured radar signal 210 is strongly attenuated due to blockage. Here, the command unit 18 may be configured to determining when a difference between respective maxima of the measured radar signal and the synthetic radar signal exceeds a predefined threshold. The difference may be represented as ($|Y_{max}-Y^*_{max}|$), where $Y_{max}$ is the maximum of the measured radar signal and $Y^*_{max}$ is the maximum of the synthetic radar signal. To obtain the enhanced radar signal 220, the emission power of the radar unit 16 is increased until the difference is below the predefined threshold.

Referring to FIG. 6, the measured radar signal 310 is shifted with high side-lobes due to miscalibration. The measured radar signal 310 may be enhanced by adjusting an antenna array calibration matrix of the radar unit 16 to minimize a difference between the measured radar signal and the synthetic radar signal. The antenna array calibration matrix A(w) may be expressed as: A(w) diag {w} where w is a calibration vector. The measured radar signal 310 (Y) may be expressed as: Y A(w)*B*x, where x is the received input signal and B is a beamforming matrix. The calibration vector w acts as a calibration parameter for a specific receive and transmit antenna. To obtain the enhanced radar signal 320, the calibration vector w is adjusted to minimize the absolute value of the difference between the measured radar signal (Y) and the synthetic radar signal (Y*) as follows: w $\mathrm{argmin}_w \|Y-Y^*\|$. Here $\mathrm{argmin}_w f(w)$ is the value of w for which $f(w)$ attains its minimum.

Referring now to FIG. 7, the measured radar signal 410 has a relatively lower resolution. The measured radar signal 410 may be enhanced by updating the respective weights or adjustable parameters used in a deep neural network (DNN) for processing the measured radar signal. As noted above, the command unit may employ a deep neural network for processing the measured radar signal. A deep neural network is an artificial neural network with multiple layers between the input and output layers. The update may include varying the adjustable parameters in the deep neural network to minimize the absolute value of $[F(Y, \phi)-Y^*]$, where Y is the measured radar signal, $\phi$ is an adjustable parameter, $F(Y, \phi)$ is a neural network output function and $Y^*$ is the synthetic radar signal. The update using the synthetic radar signal results in the enhanced radar signal 420, shown in FIG. 7, which has enhanced resolution compared to the blurred original image from the measured radar signal 310.

The command unit 18 may be configured to control operation of the vehicle 12 based in part on the enhanced radar signal. The enhanced radar signal may be used by various sub-systems in the vehicle 12, such as cruise control, collision warning systems, and blind spot detection. Referring to FIG. 1, the vehicle 12 may include an automatic braking module 50 otherwise configured to reduce motion or decelerate the vehicle 12. The vehicle 12 may include a lane change assist module 52 configured to assist the vehicle 12 in changing lanes. The command unit 18 may be configured to selectively activate the automatic braking module 50 and/or the lane change assist module 52 based in part on the enhanced radar signal.

In summary, the system 10 (via execution of method 100) improves the functioning of the vehicle 12 by leveraging the benefits of multiple sensing modalities and providing enhanced images. The synthetic radar signal generated with the aid of the lidar unit 14 is beneficial for detecting radar faults, for improving on-line calibration of the radar unit 16 and updating the neural network that processes the measured radar signal.

The command unit 18 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, other physical media, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a group of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowcharts illustrate an architecture, functionality, and operation of possible implementations of systems, methods, and computer program products of various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based storage systems that perform the specified functions or acts, or combinations of specific purpose hardware and computer instructions. These computer program instructions may also be stored in a computer-readable medium that can direct a command unit or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used here indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system of controlling operation of a vehicle, the system comprising:
   a lidar unit and a radar unit operatively connected to the vehicle and configured to obtain measured lidar datapoints and a measured radar signal, respectively;
   a command unit adapted to receive the measured lidar datapoints and the measured radar signal;
   wherein the command unit has a processor and tangible, non-transitory memory on which instructions are recorded, the command unit being configured to:
      identify respective objects in the measured lidar datapoints;
      assign a respective radar reflection intensity to the measured lidar datapoints of the respective objects;
      generate a synthetic radar signal based in part on the respective radar reflection intensity; and
      obtain an enhanced radar signal by adjusting the measured radar signal based on the synthetic radar signal, including adjusting an antenna array calibration matrix of the radar unit to minimize a difference between the measured radar signal and the synthetic radar signal.

2. The system of claim 1, wherein obtaining the enhanced radar signal includes:
   determining when a difference between respective maxima of the measured radar signal and the synthetic radar signal exceeds a predefined threshold; and
   increasing an emission power of the radar unit until the difference is below the predefined threshold.

3. The system of claim 1, wherein the command unit is configured to employ a deep neural network for processing the measured radar signal and obtaining the enhanced radar signal includes updating respective weights in the deep neural network.

4. The system of claim 1, wherein the vehicle includes an automatic braking module adapted to decelerate the vehicle, the command unit being configured to selectively activate the automatic braking module based in part on the enhanced radar signal.

5. The system of claim 1, wherein identifying the respective objects in the measured lidar datapoints includes classifying the respective objects into a plurality of categories via a predefined neural network.

6. The system of claim 5, wherein:
   the plurality of categories includes at least one of motor vehicles, pedestrians, ground, buildings, utility poles and vegetation; and
   the respective objects are selected to have a relatively lower reflectivity.

7. The system of claim 1, wherein the command unit is configured to represent the measured lidar datapoints in the respective objects as a two-dimensional surface in a three-dimensional volume.

8. The system of claim 7, wherein:
   the two-dimensional surface is a polygon; and
   the respective radar reflection intensity is based in part on an area of the polygon, a range from the lidar unit to the polygon, a class index of the respective object and a line angle between a line-of-sight from the lidar unit and a vector perpendicular to the surface defined by the polygon.

9. The system of claim 8, wherein the respective radar reflection intensity ($\rho$) is calculated as $\rho = 1/R^2 * g(\theta) * f(c)$, where R is the range, $\theta$ is the line angle, g is a predefined first function, c is the class index of the respective object and $f$ is a predefined second function.

10. The system of claim 1, wherein generating the synthetic radar signal includes generating an intermediate radar-received signal from the respective radar reflection intensity and generating the synthetic radar signal based in part on the intermediate radar-received signal.

11. The system of claim 1, wherein generating the synthetic radar signal includes obtaining a range Fast Fourier Transform for each predefined chirp, and obtaining a Doppler Fast Fourier Transform for each bin in the range Fast Fourier Transform.

12. A method of controlling operation of a vehicle, the vehicle having a lidar unit, a radar unit and a command unit with a processor and tangible, non-transitory memory, the method comprising:
   obtaining measured lidar datapoints and a measured radar signal from the lidar unit and the radar unit, respectively;
   identifying respective objects in the measured lidar datapoints and assigning a respective radar reflection intensity to the measured lidar datapoints of the respective objects;
   generating a synthetic radar signal based in part on the respective radar reflection intensity; and
   obtaining an enhanced radar signal by adjusting the measured radar signal based on the synthetic radar signal, including:
      determining when a difference between respective maxima of the measured radar signal and the synthetic radar signal exceeds a predefined threshold; and
      increasing an emission power of the radar unit until the difference is below the predefined threshold.

13. The method of claim 12, wherein obtaining the enhanced radar signal includes:
   adjusting an antenna array calibration matrix of the radar unit to minimize a difference between the measured radar signal and the synthetic radar signal.

14. The method of claim 12, further comprising:
   employing a deep neural network for processing the measured radar signal wherein obtaining the enhanced radar signal includes updating respective weights in the deep neural network.

15. The method of claim 12, wherein identifying the respective objects in the measured lidar datapoints includes:
   classifying the respective objects into a plurality of categories via a predefined neural network; and
   representing the respective objects as a two-dimensional surface in a three-dimensional structure.

16. The method of claim 15, further comprising:
   selecting the two-dimensional surface to be a polygon; and
   calculating the respective radar reflection intensity based in part on an area of the polygon, a range from the lidar unit to the polygon, a class index of the respective object and a line angle between a line-of-sight from the lidar unit and a vector perpendicular to the surface defined by the polygon.

17. A system of controlling operation of a vehicle, the system comprising:
   a lidar unit and a radar unit operatively connected to the vehicle and configured to obtain measured lidar datapoints and a measured radar signal, respectively;
   a command unit adapted to receive the measured lidar datapoints and the measured radar signal;
   wherein the command unit has a processor and tangible, non-transitory memory on which instructions are recorded, the command unit being configured to:

identify respective objects in the measured lidar datapoints;

assign a respective radar reflection intensity to the measured lidar datapoints of the respective objects;

generate a synthetic radar signal based in part on the respective radar reflection intensity; and obtain an enhanced radar signal by adjusting the measured radar signal based on the synthetic radar signal; and wherein generating the synthetic radar signal includes obtaining a range Fast Fourier Transform for each predefined chirp, and obtaining a Doppler Fast Fourier Transform for each bin in the range Fast Fourier Transform.

18. The system of claim 17, wherein obtaining the enhanced radar signal includes:

determining when a difference between respective maxima of the measured radar signal and the synthetic radar signal exceeds a predefined threshold; and increasing an emission power of the radar unit until the difference is below the predefined threshold.

19. The system of claim 17, wherein the command unit is configured to employ a deep neural network for processing the measured radar signal and obtaining the enhanced radar signal includes updating respective weights in the deep neural network.

* * * * *